(12) United States Patent
Lares

(10) Patent No.: US 8,333,401 B2
(45) Date of Patent: *Dec. 18, 2012

(54) CENTRAL MULTI DIRECTIONAL TRANSMISSION SYSTEM

(75) Inventor: Francisco Javier Lares, Sunland Park, NM (US)

(73) Assignee: Lares Technologies, LLC, Albuquerque, NM (US)

( * ) Notice: Subject to any disclaimer, the term of this patent is extended or adjusted under 35 U.S.C. 154(b) by 86 days.

This patent is subject to a terminal disclaimer.

(21) Appl. No.: 12/824,798

(22) Filed: Jun. 28, 2010

(65) Prior Publication Data

US 2010/0327558 A1    Dec. 30, 2010

Related U.S. Application Data

(63) Continuation of application No. 11/439,799, filed on May 23, 2006, now Pat. No. 7,784,812.

(51) Int. Cl.
*A01B 59/041* (2006.01)
*B62D 53/04* (2006.01)

(52) U.S. Cl. ........................ 280/474; 180/14.4

(58) Field of Classification Search .............. 180/14.1, 180/237, 14.4, 14.6, 14.7; 280/443, 474, 280/492

See application file for complete search history.

(56) References Cited

U.S. PATENT DOCUMENTS

| | | |
|---|---|---|
| 1,568,168 A | 1/1926 | Land, Jr. |
| 2,391,971 A | 1/1946 | Hollos |
| 2,673,616 A * | 3/1954 | Moores ..................... 180/237 |
| 3,007,590 A | 11/1961 | Mathew et al. |
| 3,035,654 A | 5/1962 | Nuttall, Jr. et al. |
| 3,183,991 A | 5/1965 | Gamaunt |
| 3,353,618 A | 11/1967 | Fisher |
| 3,397,896 A | 8/1968 | Willetts |
| 3,421,777 A | 1/1969 | Barker et al. |
| 3,454,123 A | 7/1969 | Lewis |
| 3,515,235 A * | 6/1970 | Kamner .................... 180/24.01 |
| 3,727,945 A | 4/1973 | Parker |
| 3,802,526 A * | 4/1974 | Mueller et al. ............... 180/14.4 |
| 4,074,784 A | 2/1978 | Lee et al. |
| 4,153,265 A | 5/1979 | McColl |
| 4,223,904 A | 9/1980 | McColl |
| 4,266,627 A | 5/1981 | Lauber |
| 4,366,877 A * | 1/1983 | Vissers et al. ................ 180/53.1 |
| 4,368,793 A | 1/1983 | Igarashi |
| 4,432,427 A | 2/1984 | van der Lely |
| 4,738,461 A * | 4/1988 | Stephenson et al. .......... 280/400 |
| 4,932,491 A | 6/1990 | Collins, Jr. |
| 5,011,177 A * | 4/1991 | Grice ........................... 280/482 |
| 5,363,935 A | 11/1994 | Schempf et al. |

(Continued)

*Primary Examiner* — Lesley D Morris
*Assistant Examiner* — Daniel Yeagley
(74) *Attorney, Agent, or Firm* — Luis M. Ortiz; Kermit D. Lopez; Ortiz & Lopez, PLLC

(57) ABSTRACT

A dual chassis with multi-directional transmission includes a front chassis and a rear chassis that can be united to function as a traditional unitary chassis or can be separated to become two independently, but connected, chassis that can traverse uneven terrain during ground movement. The multi-directional transmission serves to increase the distance between the two chassis and enable them to travel at differing vertical and horizontal angles with respect to the surface of the earth. As part of the multi-directional transmission, a central multi-directional mechanism connects a medial portion of said front chassis to a medial portion of said rear chassis to selectively allow for the independent horizontal and vertical movement of said front and rear chassis when traversing uneven terrain.

21 Claims, 18 Drawing Sheets

U.S. PATENT DOCUMENTS

| | | |
|---|---|---|
| 5,725,063 A | 3/1998 | Ceragioli et al. |
| 6,039,133 A * | 3/2000 | Zulu .......................... 180/6.64 |
| 6,112,843 A | 9/2000 | Wilcox et al. |
| 6,263,989 B1 | 7/2001 | Won |
| 6,267,196 B1 | 7/2001 | Wilcox et al. |
| 6,866,284 B2 | 3/2005 | Carlsson |
| 6,880,651 B2 | 4/2005 | Loh et al. |
| 7,334,645 B2 * | 2/2008 | Stevenson et al. ............ 172/677 |
| 2002/0170755 A1 | 11/2002 | Cope |
| 2002/0195795 A1 | 12/2002 | Brown |
| 2004/0023593 A1 | 2/2004 | Needham et al. |
| 2006/0151971 A1 * | 7/2006 | Buehler et al. ............. 280/446.1 |

* cited by examiner

CENTRAL MULTI DIRECTIONAL TRANSMISSION SYSTEM

RELATED APPLICATIONS INCORPORATED BY REFERENCE

This patent application is a continuation of U.S. patent application Ser. No. 11/439,799 filed on May 23, 2006, now U.S. Pat. No. 7,784,812 entitled "Central Multi Directional Transmission System" and which is incorporated herein by reference in its entirety.

BACKGROUND OF THE INVENTION

The present invention relates generally to directional transmission systems and, more specifically, to a new chassis with a central multi direction transmission system that works activating each of its mechanisms or gears with electric motors or hydraulic injection motors.

The present invention provides a totally different chassis then that which exists in the market, providing an innovation of a central mechanism in the chassis, which main function consists on a system that will drive its force multi directionally, semi mechanisms that allow the vehicle's ample mobility and grip as needed on hard to reach terrain.

When the central mechanism is activated to both sides on first position and opening and closing the main central piston, will ride imaging a worm, this will make it strong and safe on any hard to reach terrain due to the fact that this mechanism makes it even more self protected because of its multiple positions.

The novelty consists in two half chassis joined by the central mechanism with a maximum torsion of 50° between each other, bending its mechanism 60° to both sides with the mechanism on first position turning the mechanism 90° to the left will put it in position to bring it up or down.

The distinguishing characteristics of this novel chassis are the chassis is formed on its frontal part by a half chassis attached in a second chassis joined by a multi direction central mechanism, its two bars and its semi mechanisms. When chassis is connected to its two bars, it will work as a traditional chassis with little torsion. The novelty consists in the essential technical characteristics that this new invention withholds in order to be activated in all of its following positions and functions. The first step will be deactivate and retract the two central bars that will be embedded in the half chassis tips and will be deactivated retracting them and will come in and out on pressure into the second chassis and will be attached by an automatic pressure lock by its two hydraulic pistons generating a primary gap between the two half chasses, these bars when retracted will be embedded in their pistons and in the half chassis tips. A second gap will be given when opening the central hydraulic piston lineally separating both half chasses. The piston will attach to its stable side to the back chassis on the secondary bridge. The second moving part consists in the central hexagonal bar which is guided on a bearing in its hexagonal guide placed in the back chassis center of the front bridge that will allow the hexagonal bar's displacement in a lineal form in its back half chassis when these two bars open, the central piston will give a maximum gap to allow the flexion of its main or initial position. In this position the central mechanism will be ready to be activated by its main worm screw that transfers the strength to the central gear placed in its peripheral section to the hexagonal central bar in its central part, the transference on this said force is obtained by three gears that allow the flexion of the mechanism with the strength of an electric motor, the mechanism will give a turn of 60° or more in the chassis. This will allow it to make "U" turns in only one maneuver and in a reduced space using the vehicles normal traction and direction, added to the flexion of the mechanism. This new multi direction chassis, has a second important position that will come to place when turning the hexagonal central bar with its auxiliary mechanism that is mounted in the hexagonal central bar, semi attached to the front bridge of its half chassis between the initial position and the second position and contains two bumps that are 90° one from the other attached to the inner part of this half chassis. In the same bridge, in the inner part of the two bumps consists an opposite bump that is one that will allow the mechanism to turn to its original position and to the second position. This opposite bump is mounted in the central bar and it can be moved to its front part to allow the mechanism to turn 360° or more accordingly to the terrain difficulty. For this multi direction mechanism to turn 360° the brake disc must be loose from the central brake and open or separate the clutch mechanism gear to set free the central mechanism from the shock absorbers which can stay in the primary position or second position when the opposite bump returns electromechanically from position to the turning position of 90° the disc brake will be controlled voluntarily depending on the conditions of the terrain with the brake drum.

This multi direction mechanism will be activated by its main worm screw in any of its two positions that move the three main gears. In the secondary position the mechanism will go up and down. The efficiency of the multi direction chassis of the present invention also resides in other fundamental part in the front half chassis between the back bridge and the two shock absorbers and counts with a geared clutch mechanism mounted in the central bar guide and next to the disc brake. Mounted and attached to the central bar in its frontal part, the bar will pass the bridge guided by a bearing, where the main torsion will take place, between two half chassis, this torsion difference will be of 50° or more. The disc brake has to be 100% on its braking position when the vehicle is functioning on the highway, to avoid the torsion and maintain the stability of a traditional chassis when this new chassis runs on hard to reach terrain. The brake will be gradually liberated when its required to maintain better traction and access over the terrain, the torsion of the two half chassis will be mitigated by two shock absorbers and placed in perpendicular position in the front half chassis in the respective tracks and hooked from its moving parts to the central front to avoid that both chassis move in a harsh way during the traction due to the matter that both chassis are connected in this position only by its central bar and multi direction mechanism. The first left shock absorber is located in the inner central part of the front half chassis in the front of the gear clutch in the central bar attached at one distal end to the upper part of the main arm. The main arm is mounted on the front end of the main central bar and has a vertical initial position of 90° according to its second arm in its initial position with the vehicle leveled at 0° of torsion, including the 90° turn of the central mechanism, 50° of each side and the 25° of torsion. These degrees of torsion are included in the 50° torsion on each side, the 50° or more will accrue when lifting or bringing down one wheel or a vehicles corner, leaving the other half chassis in a horizontal position or 0° of torsion.

Other main objectives of the present invention is that when driving the vehicle in hard to reach terrain, the torsion is divided in two half chassis that will be 25° or more each half chassis. For example, 36° one half chassis and 14° the other half chassis or 39° one half chassis and 11° the other half chassis and 44 one half chassis and 46 other half chassis, according to the terrain for which it is designed for.

DRAWING

The left shock absorber is supported by a second right shock absorber attached to a second arm.

The central mechanism will put the front half chassis in two other positions, when the chassis is leveled or not leveled, it will lift both front corners, one at a time, and is done by calculating a lighter weight or cargo on the front part or leave the back portion for cargo. To lift the right wheel or corner of the front chassis it has to have its two bars deactivated and the mechanism being in its initial or second position with the front central disc brake applied 100% and when the turning gear is activated to its left side, it will lift the right wheel and corner. To lift the left wheel or corner of the front chassis, the brake must be applied 100%.

The multi direction chassis of the present invention can be positioned in all directions making it of easier maneuverability off the road, therefore with the new chassis it will maintain a more efficient traction then the existing all terrain vehicles. This new invention allows the vehicle to drive over straight obstacles of up to 33 inches or more in height.

This new chassis has another new important characteristic, it will be able to turn over by itself, first, it will turn over the lighter half chassis, the first step will be to apply the central disc brake 100% when activating the back turning mechanism in any of its both ways.

Having a half chassis in its normal position, the second step will be to activate a counterbalance system to make the half chassis on normal position heavier, this counterbalance could be any liquid or fuel and when the turning mechanism is applied again, in any of its both ways with the brake disc applied 100% the lighter chassis will turn over.

DESCRIPTION OF THE PRIOR ART

There are other all terrain vehicles designed for off road. Typical of these in U.S. Pat. No. 4,074,784 issued to Lee et al. on Feb. 21, 1978.

Another patent was issued to McColl on May 8, 1979 as U.S. Pat. No. 4,153,265. Yet another U.S. Pat. No. 4,223,904 was issued to McColl on Sep. 23, 1980 and still yet another was issued on May 12, 1981 to Lauber as U.S. Pat. No. 4,266,627.

Another patent was issued to van der Lely on Feb. 21, 1984 as U.S. Pat. No. 4,432,427. Yet another U.S. Pat. No. 4,932, 491 was issued to Collins, Jr. on Jun. 12, 1990. Another was issued to Schempf et al. on Nov. 15, 1994 as U.S. Pat. No. 5,363,935 and still yet another was issued on Sep. 5, 2000 to Wilcox et al. as U.S. Pat. No. 6,112,843.

Another patent was issued to Won on Jul. 24, 2001 as U.S. Pat. No. 6,263,989. Yet another U.S. Pat. No. 6,267,196 was issued to Wilcox on Jul. 31, 2001.

U.S. Pat. No. 4,074,784

Inventor: Arthur L. Lee et al.

Issued: Feb. 21, 1978

The haulage vehicle has a frame member with separate front and rear sections that are connected to each other by universal means and are free to articulate in a plurality of planes. The frame rear section has a transversely mounted rear axle adjacent the rear portion on which a pair of propelling wheels are mounted and a transversely mounted intermediate axle adjacent the front portion of the frame rear section on which a pair of intermediate propelling wheels are mounted. The frame front section has a transversely mounted front axle on which a pair of front propelling wheels are mounted. Separate propelling motors are mounted adjacent each of the propelling wheels and are drivingly connected to the adjacent propelling wheel. All of the propelling wheels are steerable and the drive motors are movable therewith. A body member is supported on the frame rear section and a boom member is supported on the frame front section. The boom member is connected to the body member by a plurality of longitudinally extending flexible plates, so that the boom and body members are free to articulate in a plurality of planes. Endless conveying means are positioned in the longitudinal haulage compartment formed by the body and boom members. With this arrangement all of the propelling wheels on the haulage vehicle remain in contact with the ground as the haulage vehicle moves over uneven terrain and the haulage vehicle follows the contour of the uneven terrain.

U.S. Pat. No. 4,153,265

Inventor: Bruce J. McColl

Issued: May 8, 1979

A high-mobility wheeled vehicle for transporting long loads over roadless terrain. The vehicle has front and rear quad wheel assemblies pivotally connected to a centrally disposed elongated bed frame so as to permit lateral rotation of these assemblies about the longitudinal axis of the frame. A roll control means interconnects the quad wheel assemblies and the bed frame to proportionately control the relative angular movement. The wheels of each quad wheel assembly are paired together by walking beam members, thus providing a suspension system having balanced load distribution between the wheels over a wide range of terrain roughness conditions. A differential drive system provides a balanced distribution of power to each wheel on both assemblies under all wheel drive conditions. Preferably, each of these wheels is steerable and the steering control means provides for oblique travel in conjunction with conventional steering.

U.S. Pat. No. 4,223,904

Inventor: Bruce J. McColl

Issued: Sep. 23, 1980

A high mobility wheeled vehicle for transporting long loads, such as trimmed tree trunks or whole trees, over roadless terrain. The vehicle has front and rear quad wheel assemblies pivotally connected to a centrally disposed elongated bed frame so as to permit lateral rotation of these assemblies about a roll axis disposed below and parallel to the longitudinal axis of the bed frame. A linkage type roll control means interconnects the quad wheel assemblies and the bed frame to proportionately control the relative angular movement of the bed frame with respect to the quad wheel assemblies. The roll control means includes a plurality of interconnected links plus a pair of power extensible links for selectively adjusting the steady state position of the vehicle bed relative to the quad wheel assemblies in either direction. In a modification, parallel links are employed to interconnect the quad wheel assemblies with pivotally mounted load supporting cradles.

U.S. Pat. No. 4,266,627

Inventor: Ernst Lauber

Issued: May 12, 1981

A traveling assembly, especially a wheel suspension, for a vehicle capable of rolling and stepping or walking travel upon a regular or uneven surface, e.g. for cranes, excavators, construction, earth-moving, mining and other machinery in which wheels are articulated at the ends of legs which, in turn, are pivotally connected to a support structure. The legs themselves are formed with telescoping support elements which can be extended and retracted while a fluid-pressure cylinder can be provided to pivot the arm which is articulated to the lower end of the leg and which carries the wheel.

U.S. Pat. No. 4,432,427

Inventor: Cornelis van der Lely

Issued: Feb. 21, 1984

A tractor has three pairs of ground wheels: front and rear steerable pairs which cooperate to steer the tractor, and a central pair. The central pair of wheels each are connected to the frame through a hydraulic cylinder and piston assembly which can be controlled to raise those wheels above the ground or to lower the wheels to engage the ground. The central wheels can be the same as the other wheels or traction caged wheels of hallow beams wherein a hub is connected to outer fellies with spokes. Supports interconnect the fellies at the inner or outer sides. All of the wheels can be driven independently by an engine and the central wheels are each detachable from a driven axle. The hub of the central wheels includes an outer cylindrical sleeve to which and end plate and the spokes are affixed. Each wheel is mounted on a hydraulic motor which is mounted on the tractor's frame, the forward and rear motors being turnable with the wheels mounted thereon. Hydraulically actuated three-point lift devices are provided on the tractor frame to extend forward between the front two wheels and rearwardly between the two rear wheels. Front and rear power take-off shafts are also provided. Power is provided by an engine located between the axes of rotation of the front and central wheels which energized a hydraulic pump that in turn, separately powers each of the hydraulic motors and the other hydraulic actuated mechanisms.

U.S. Pat. No. 4,932,491

Inventor: Earl R. Collins, Jr.

Issued: Jun. 12, 1990

A rough terrain vehicle is described which includes auxiliary wheels that can be deployed to avoid overturning the vehicle when turning while traversing a slope, to climb an embankment or the like, and to right the vehicle when it is overturned. The vehicle includes a pair of front and rear primary wheels, and a pair of auxiliary arms having inner ends pivotally mounted on the front wheel axes and outer ends that carry auxiliary wheels. A motor can turn the arms to move the auxiliary wheels from a stowed position about halfway between the front and rear wheels and above the ground, to a second position against the ground to stabilize the vehicle. The arms can be turned more than 180 degree to move the auxiliary wheels in front of the front primary wheels to help climb an embankment. The primary wheels can be mounted at the end of primary front wheels but also the inner ends of the auxiliary arms.

U.S. Pat. No. 5,363,935

Inventor: Hagen Schempf et al.

Issued: Nov. 15, 1994

A reconfigurable mobile vehicle having at least one endless driven member and a motor for driving the endless member on a surface capable of supporting a magnetic circuit. The vehicle is equipped with a magnetic system that comprises a magnet, a fixed magnetic circuit member, and a movable magnetic circuit member for establishing first and second magnetic circuits. A clutch is provided to selectively connect the movable magnet circuit member to the motor to move the movable magnetic circuit member between a first position wherein the first magnetic circuit is established such that the endless driven member can magnetically engage the surface and a second position wherein the second magnetic circuit is established such that the endless member does not magnetically engage the surface. The vehicle is equipped with sensing apparatuses for analyzing the structural integrity of the surface upon which the vehicle is riding and is also equipped with acoustical positioning apparatus for assisting the operating personnel and computer in locating and controlling the vehicle's position within an enclosed environment. The vehicle is also equipped with a tether line that is issued to facilitate the transfer of control power/data between the vehicle and the various operating components attached thereto and a control console located remote from the vehicle. The tether line is also used to deploy and retrieve the vehicle.

U.S. Pat. No. 6,112,843

Inventor: Brian H. Wilcox et al.

Issued: Sep. 5, 2000

A vehicle, for driving over a ground surface, has a body with a left side, a right side, a front and a back. The vehicle includes left and right drive mechanisms. Each mechanism includes first and second traction elements for engaging the ground surface and transmitting a driving force between the vehicle and ground surface. Each mechanism includes first and second arms coupled to the first and second traction elements for relative rotation about first and second axis respectively. Each mechanism includes a rotor having a third axis, the rotor coupled to the body for rotation about the third axis and coupled to the first and second arms for relative rotation about the third axis. The mechanism includes first and second drive motors for driving the first and second traction elements and first and second transmissions, driven by the first and second motors and engaging is the rotor. Driving the first and second traction elements simultaneously rotates the rotor relative to the first and second arms, respectively.

U.S. Pat. No. 6,263,989

Inventor: Chikyung Won

Issued: Jul. 24, 2001

An articulated tracked vehicle that has a main section, which includes a main frame, and a forward section. The main frame has two sides and a front end, and includes a pair of parallel main tracks. Each main track includes a flexible continuous belt coupled to a corresponding side of the main frame. The forward section includes an elongated arm. One end of the arm is pivotally coupled to the main frame near the forward end of the main frame about a transverse axis that is generally perpendicular to the sides of the main frame. The arm has a length sufficiently long to allow the forward section to extend below the main section in at least some degrees of rotation of the arm, and a length shorter than the length of the main section. The center of mass of the main section is located forward of the rearmost point reached by the end of the arm in its pivoting about the transverse axis. The main section is contained within the volume defined by the main tracks and is symmetrical about a horizontal plane, thereby allowing inverted operation of the robot.

U.S. Pat. No. 6,267, 196

Inventor: Brian H. Wilcox et al.

Issued: Jul. 31, 2001

A vehicle, for driving over a ground surface, has a body with a left side, a right side, a front and a back. The vehicle includes left and right drive mechanisms. Each mechanism includes first and second traction elements for engaging the ground surface and transmitting a driving force between the vehicle and ground surface. Each mechanism includes first and second arms coupled to the first and second traction elements for relative rotation about first and second axis respectively. Each mechanism includes a rotor having a third axis, the rotor coupled to the body for rotation about the third axis and coupled to the first and second arms for relative rotation about the third axis. The mechanism includes first and second drive motors for driving the first and second traction elements and first and second transmissions, driven by the first and second motors and engaging the rotor. Driving the first and second traction elements simultaneously rotates the rotor relative to the first and second arms, respectively.

While these all terrain vehicles may be suitable for the purposed for which they were designed, they would not be as suitable for the purposes of the present invention, as hereinafter described.

SUMMARY OF THE PRESENT INVENTION

A primary object of the present invention is to provide a new chassis with a multi direction mechanism and form of chassis that is different to existing chassis found on the market today in a versatile all terrain vehicle.

Another object of the present invention is to provide a central multi directional transmission system that works activating each of its mechanisms or gears with electric motors or hydraulic injection motors.

Yet another object of the present invention is to provide a central multi directional transmission system that will drive its force multi directionally, with semi mechanisms that allow the vehicle's ample mobility and grip as needed on hard to reach terrain.

Still yet another object of the present invention is to provide a central multi directional transmission system that when the central mechanism is activated to both sides on first position and opening and closing the main central piston, will ride imaging a worm, this will make it strong and safe on any hard to reach terrain due to the fact that this mechanism makes it even more self protected because of its multiple positions.

Another object of the present invention is to provide a central multi directional transmission system that consists in two half chassis joined by the central mechanism with a maximum torsion of 50° or more between each other, bending its mechanism 60° to both sides with the mechanism on first position turning the mechanism 90° to the left will put it in position to bring it up or down.

Yet another object of the present invention is to provide a central multi directional transmission system that the chassis is formed on its frontal party by a half chassis attached in a second chassis joined by the multi direction central mechanism, its two bars and its semi mechanisms.

Still yet another object of the present invention is to provide a central multi directional transmission system that will be deactivate and retract the two central bars that will be embedded in the half chassis tips and will be deactivated retracting them and will come in and out on pressure into the second chassis and will be attached by an automatic pressure lock by its two hydraulic pistons generating a primary gap between the two half chasses, these bars when retracted will be embedded in their pistons and in the half chassis tips.

Additional objects of the present invention will appear as the description proceeds.

The present invention overcomes the shortcomings of the prior arty by providing a central multi directional transmission system that a second gap will be given when opening the central hydraulic piston lineally separating both half chasses. This piston will attach to its stable side to the back chassis on the secondary bridge. The second moving part consists in the central hexagonal bar which is guided on a bearing in its hexagonal guide placed in the back chassis center of the front bridge that will allow the hexagonal bar's displacement in a lineal form in its back half chassis when these two bars open, the central piston will give a maximum gap to allow the flexion of its main or initial position. In this position the central mechanism will be ready to be activated by its main worm screw that transfers the strength to the central gear placed in its peripheral section to the hexagonal central bar in its central part, the transference on this said force is obtained by three gears that allow the flexion of the mechanism with the strength of an electric motor, the mechanism will give a turn of 60° or more in the chassis. This will allow it to make "U" turns IN only one maneuver and in a reduced space using the vehicles normal traction and direction, added to the flexion of the mechanism.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS FIGURES

In order that the invention may be more fully understood, it will now be described, by way of example, with reference to the accompanying drawing in which.

DESCRIPTION OF THE REFERENCE NUMERALS

Figure 1:
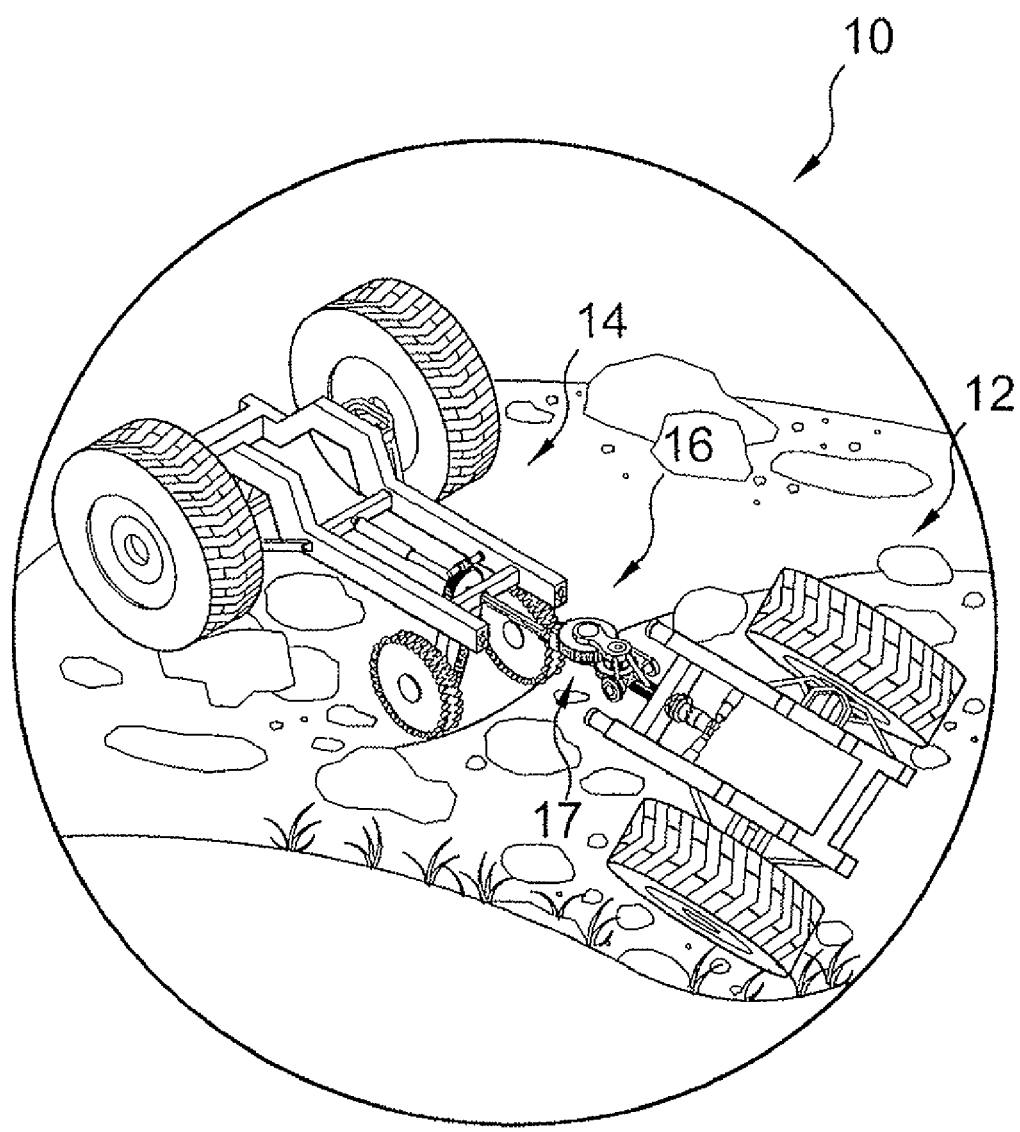
FIG. 1 is an illustrative view of the central multi direction transmission system of the present invention in use.

Turning now descriptively to the drawings, in which similar reference characters denote similar elements throughout the several views, the figures illustrate the Dual Chassis Frame with Multi-Directional Transmission of the present invention. With regard to the reference numerals used, the following numbering is used throughout the various drawings figures.

10 Dual Chassis Frame with Multi-Directional Transmission of the present invention
12 front chassis
14 rear chassis
16 multi-directional transmission
17 central multi-directional mechanism
18 fixed wheel
20 retractable wheel
22 side frame of 12
23 side frame of 14
24 first bridge of 14
26 rear bridge of 14
28 secondary bridge of 14
30 central bar
32 front bridge of 12
34 rear bridge of 12
36 central hydraulic piston
38 shaft of 36
40 hexagonal bar
42 main bar
44 bump
46 central disc brake
48 clutch gear
50 back central gear
52 arm support of 30
54 shock absorber
56 turning auxiliary mechanism
58 bearing guide
60 pressure lock
62 main central gear
64 main worm screw
66 worm drive of 56
68 primary gap
70 second gap
72 union
74 cardan
76 yoke

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the central multi direction transmission system of the present invention 10 in use. The present invention 10 refers to a dual chassis frame having a unifiable front chassis 12 and rear chassis 14 with a central multi direction transmission system 16 that works by activating each of its mechanisms or gears with electric motors or hydraulic injection motors. The object of the invention 10 is to provide a totally different chassis then the ones that exist in the market, based in the innovation of a central multi directional mechanism 17 in the chassis which main function consists on a system that will drive its force multi directionally, semi mechanisms that allow the vehicle's ample mobility and grip as needed on hard to reach terrain as shown in illustration. When the central multi-directional mechanism 17 is activated both sides, left or right, on first position and opening and closing the main central piston, will ride imaging a worm, making it strong and safe on any hard to reach terrain due to this mechanism that makes it even more self protected because of its multiple positions. The novelty consists in the front chassis 12 and the rear chassis 14 joined by the central multi-directional mechanism 17 with maximum torsion of 50° or more between each other, bending its mechanism 17 60° to both sides with the mechanism 17 on first position turning the mechanism 17 90° to the left will put in position to bring it up or down. The front chassis 12 and rear chassis 14 each have a pair of distally disposed fixed wheels 18 and medially disposed retractable wheels 20.

Figure 2:
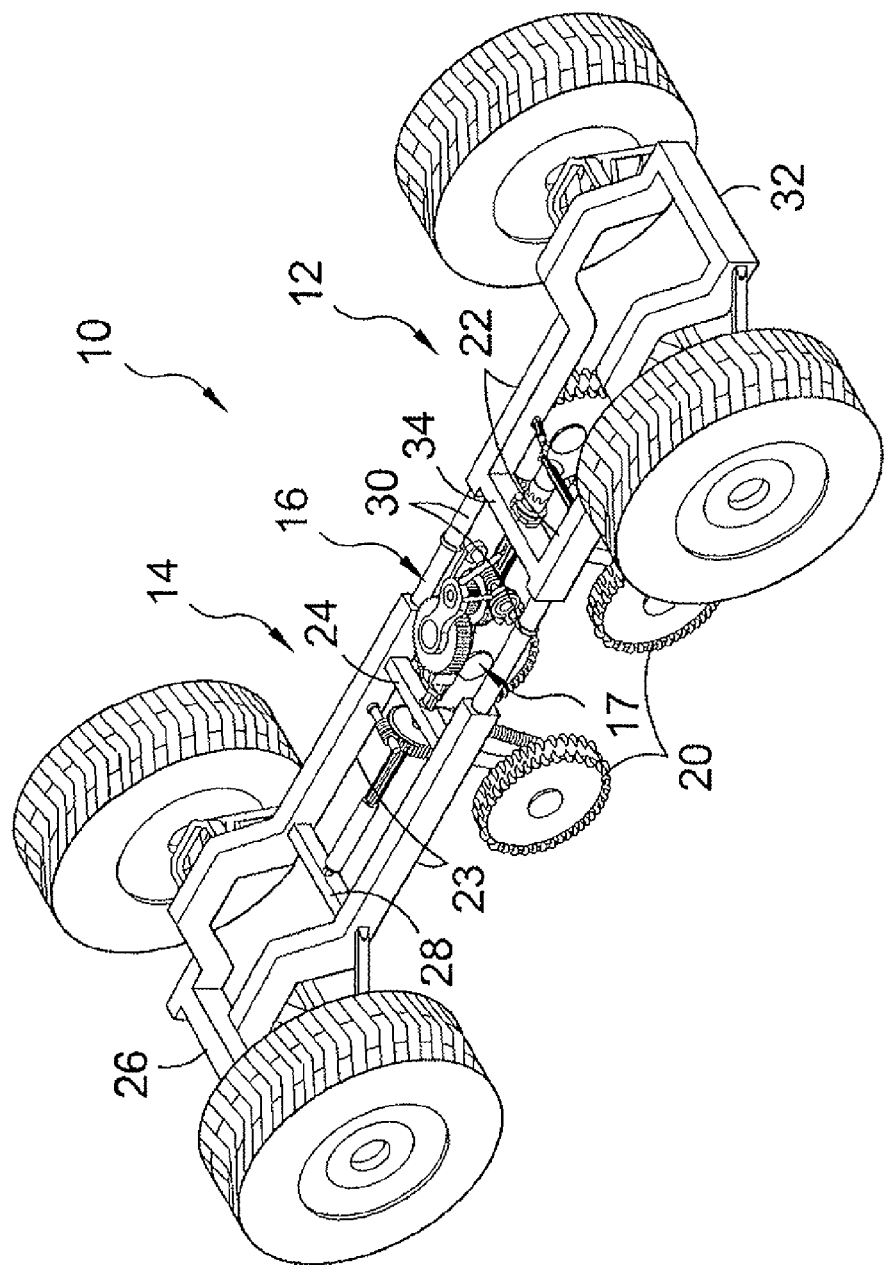
FIG. 2 is a perspective view of the multi direction transmission system of the present invention.

FIG. 2 is a perspective view of the multi direction transmission system of the present invention 10. The present invention 10 is a dual chassis with a central multi-direction transmission 16 shown as a traditional unified chassis. The front chassis 12 and rear chassis 14 are joined together by two central bars 30 and the multi direction mechanism 17. When the front chassis 12 and the rear chassis 14 are connected by the two central bars 30, it works as a traditional chassis with little torsion. The novelty consists in the essential technical characteristics that the present invention 10 withholds in order to activate all positions and functions.

Shown is the present invention 10 during the initial transitional phase between unified chassis operation and dual chassis operation with the central bars 30 extended from the front chassis 12 but still secured to the rear chassis 14 and the retractable wheels 20 lowered to the operational position. The retractable wheels 20 are in the raised position during unified chassis operation.

The front chassis 12 comprises a pair of side frames 22 connected by a front bridge 32 and a rear bridge 34. The rear chassis 14 comprises a pair of side frames 23 connected by the first bridge 24 and a rear bridge 26 with a secondary bridge 28 disposed therebetween.

Figure 3:
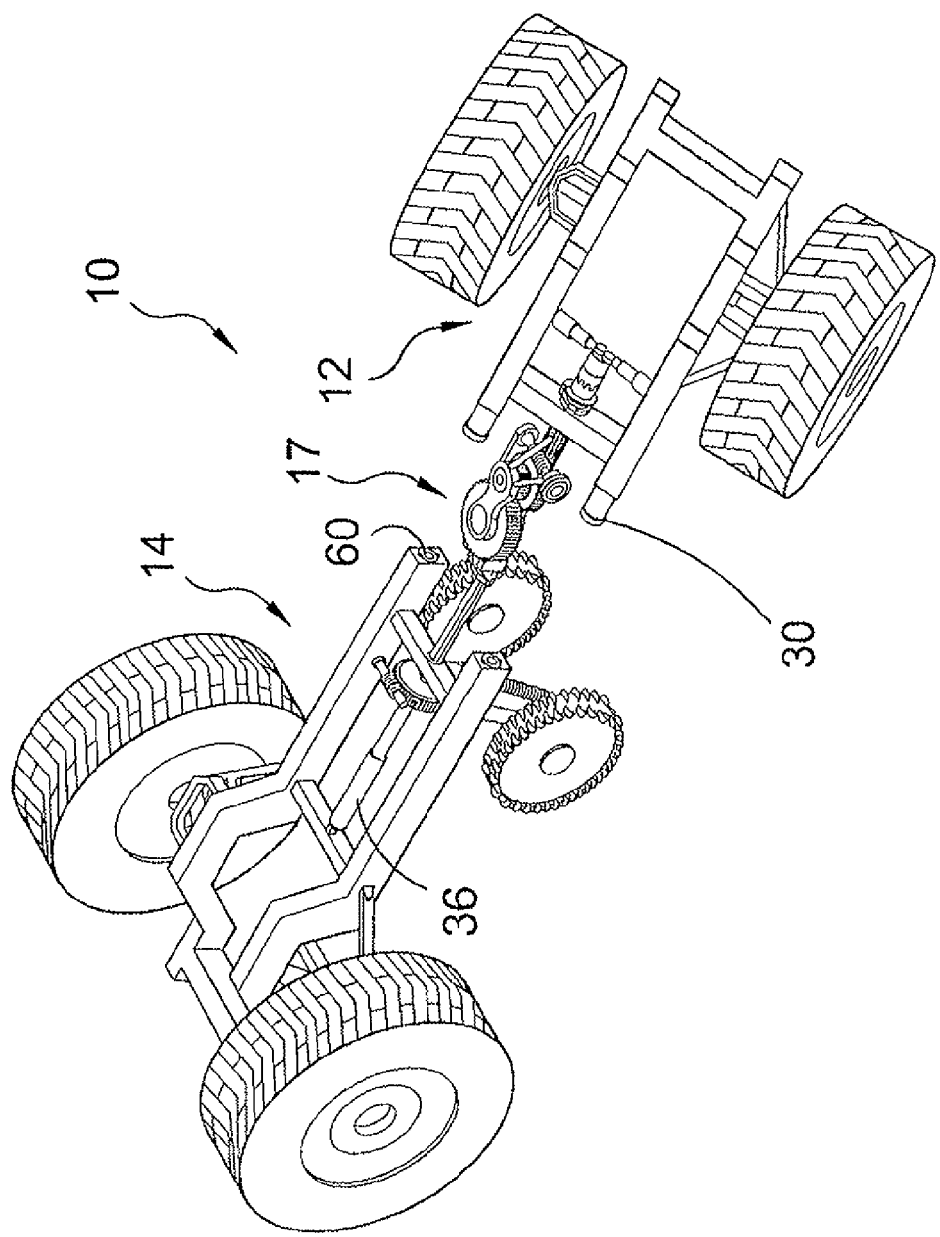
FIG. 3 is a perspective view of the present invention with central bars retracted.

FIG. 3 is a perspective view of the present invention 10 with the central bars 30 retracted. The present invention 10 is a dual chassis with a central multi-direction transmission system 10 shown with front chassis 12 and the rear chassis 14 with the two retracted central bars 30 retracted upon release of the pressure locks 60 and joined only by the multi direction central mechanism 17 thereby forming a gap between the front chassis 12 and the rear chassis 14. On its first position and the central hydraulic piston 36 opened, and the multidirection mechanisms will be ready to be activated in all of their multiple positions.

Figure 4:
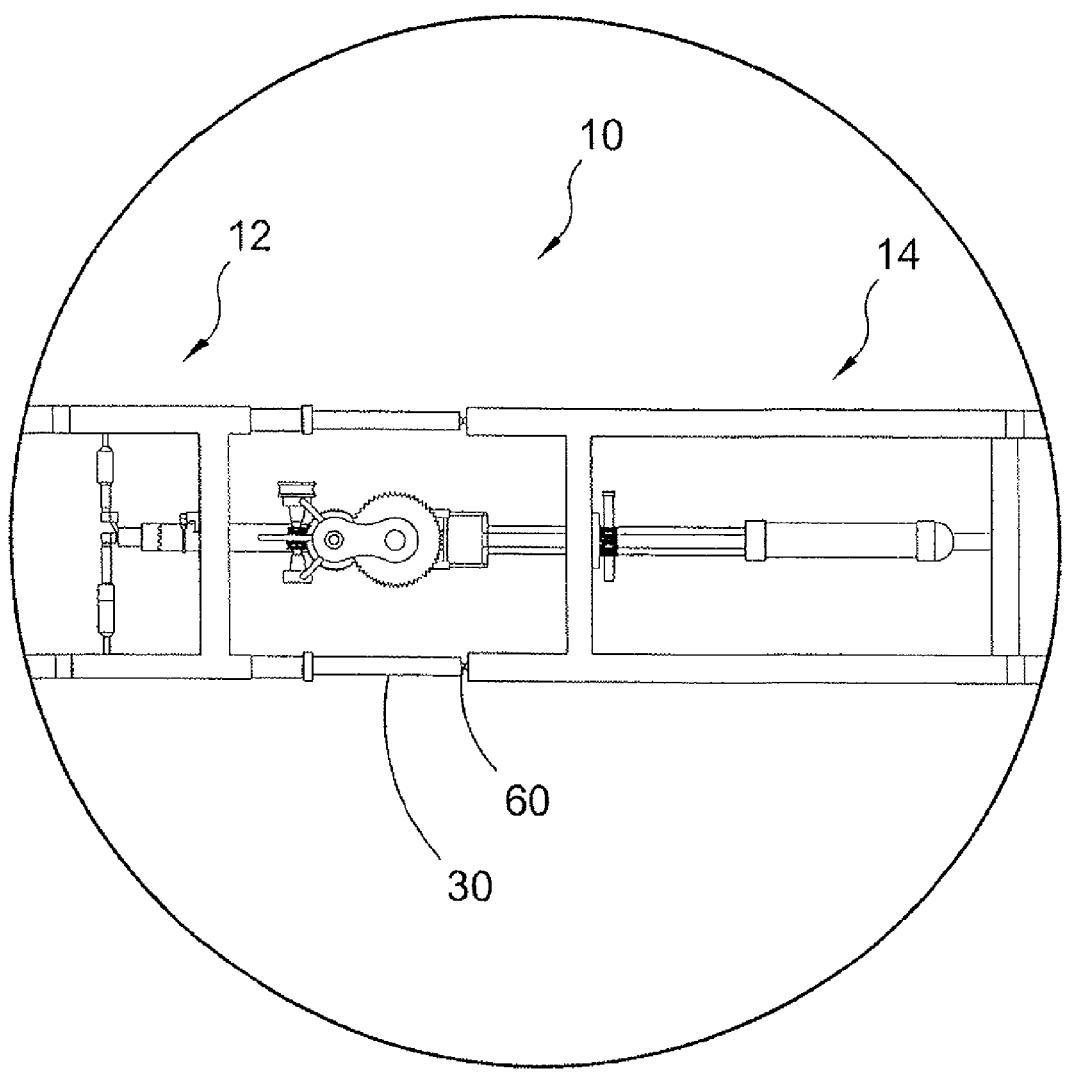
FIG. 4 is a detailed view of the multi direction transmission system of the present invention.

FIG. 4 is a detailed view of the multi direction transmission system of the present invention 10. The present invention 10 is shown with the front chassis 12 and the rear chassis 14 connected. To operate the system the first step is to deactivate and retract the two central bars 30 within the half chassis tips. They are deactivated, retracting them in or out on pressure into the front chassis 12 and are attached by automatic pressure locks 60 and by its two hydraulic pistons, generating a primary gap between the two chassis.

Figure 5:
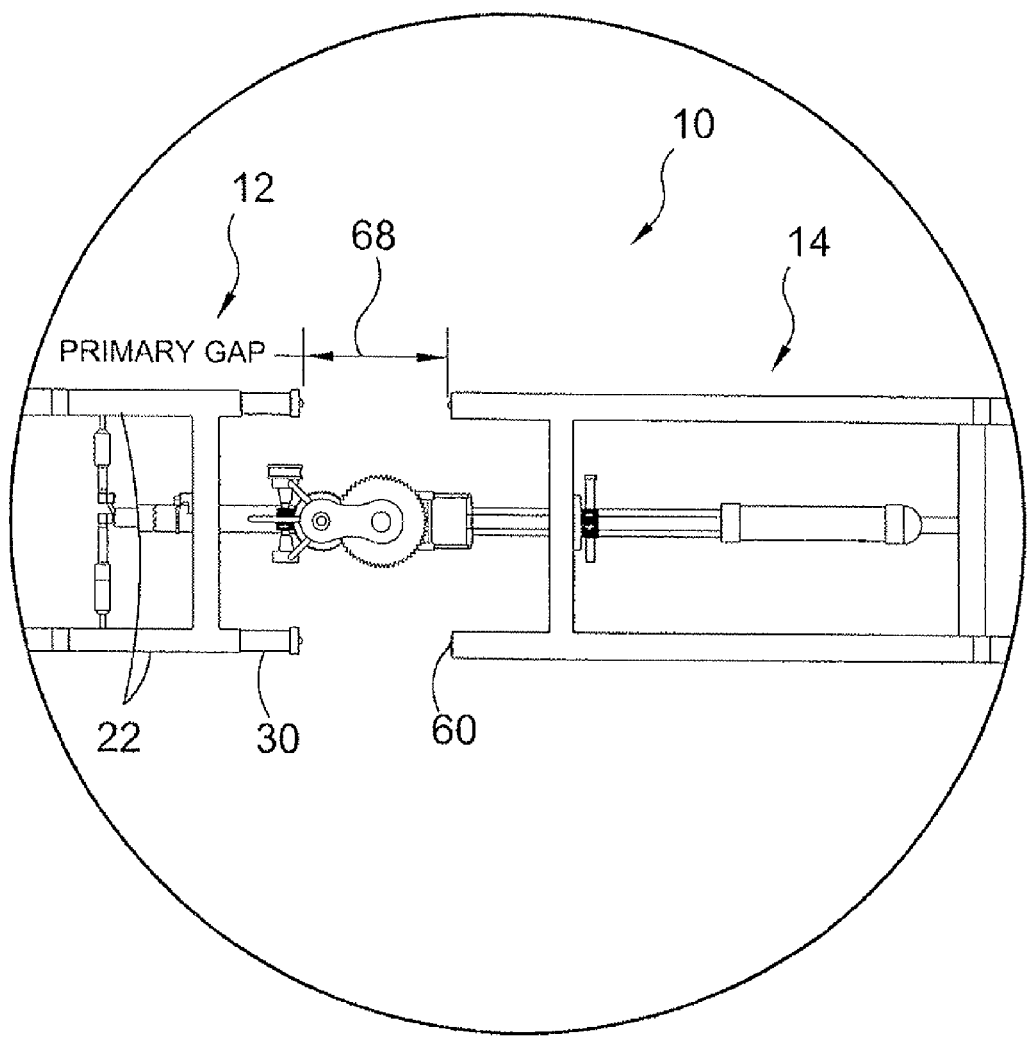
FIG. 5 is a detailed view of the present invention with central bars retracted to a primary gap.

FIG. 5 is a detailed view of the present invention 10 with central bars 30 retracted to a primary gap during the transition to dual chassis operation mode. To operate the system, the first step is to deactivate and retract the two central bars 30 within the tips of the side frames 22 of the front chassis 12. They are deactivated, retracting them in or out on pressure into the front chassis 12 and are attached by automatic pressure locks 60 and by its two hydraulic pistons, generating a primary gap 68 between the front chassis 12 and the rear chassis 14 which are now only joined by the central multi-directional mechanism 17.

Figure 6:
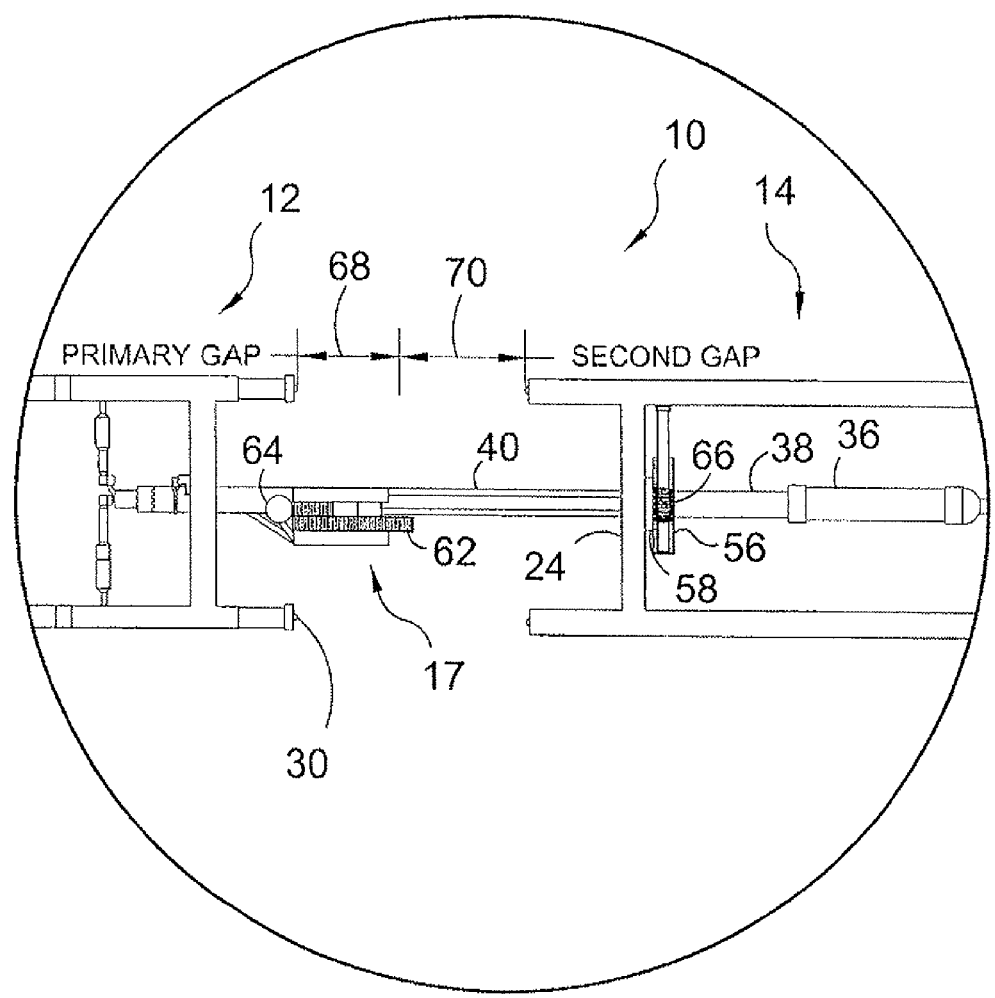
FIG. 6 is a detailed view of the present invention with central bars retracted to a maximum gap.

FIG. 6 is a detailed view of the present invention 10 with the shaft 38 of the central hydraulic piston 36 extended to form a maximum gap separating the front chassis 12 from the rear chassis 14. The central hydraulic piston 36 will attach on its stable side to the rear chassis 14 on the secondary bridge. The second moving part consists in the central hexagonal bar 40 which is guided on a bearing 58 in its hexagonal guide placed in the first bridge 24 of the rear chassis 14 that will allow for the hexagonal bar's 40 displacement in a lineal form in the rear chassis 14 and when the two central bars 30 open and the central hydraulic piston 36 is fully extended will add a second gap 70 to the primary gap 68 to provide a maximum gap to allow the flexion of its main or initial position and in this position the central multi-directional mechanism 17 will be ready to be activated by its main worm screw 64 that transfers the strength to the main central gear 62 placed in its peripheral section to the hexagonal center bar 40 in its central part, the transference of said force is obtained by three gears that allow the flexion of the mechanism and with the strength of an electric motor. The advancement of the horizontal bar 40 is affected by turning auxiliary mechanism 56 and it's related worm drive 66 to result in the rotation thereof thus turning the central multi-directional mechanism 17 to the vertical position.

Figure 7:
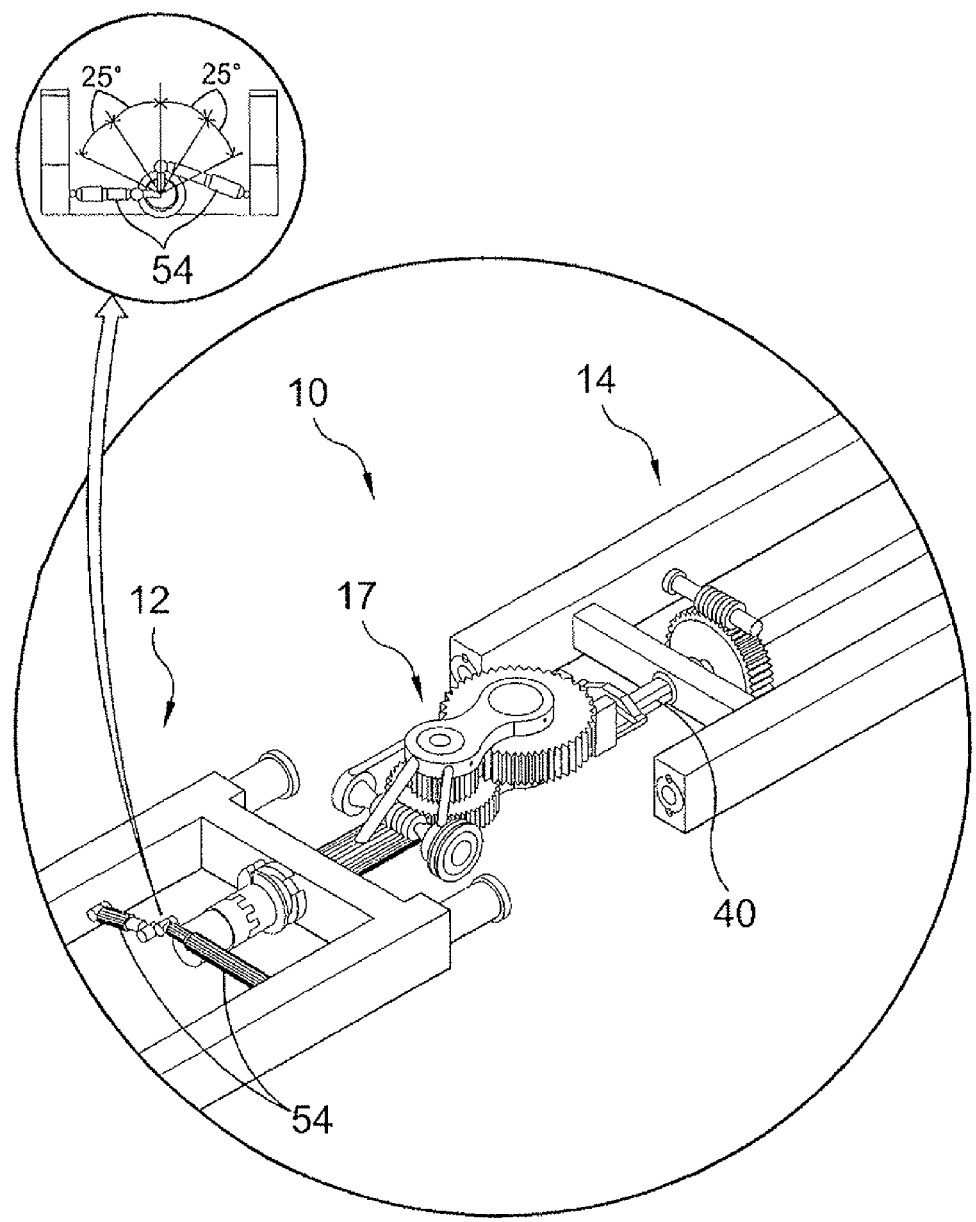
FIG. 7 is a detailed view of the central multi direction transmission system of the present invention.

FIG. 7 is a detailed view of the present invention 10 showing the front chassis 12 separated from the rear chassis 14 and ready to be activated in its first position. Shown in its detail is the 25° torsion, or more, of each chassis half. Being 50° or more of proper torsion, for a continued circulation in this position the mechanism will bend the chassis to its both sides. The central multi-directional mechanism 17 remains in the horizontal position until the central hydraulic piston is activated to advance the hexagonal bar 40. The shock absorbers 54 remain in the first position.

Figure 8:
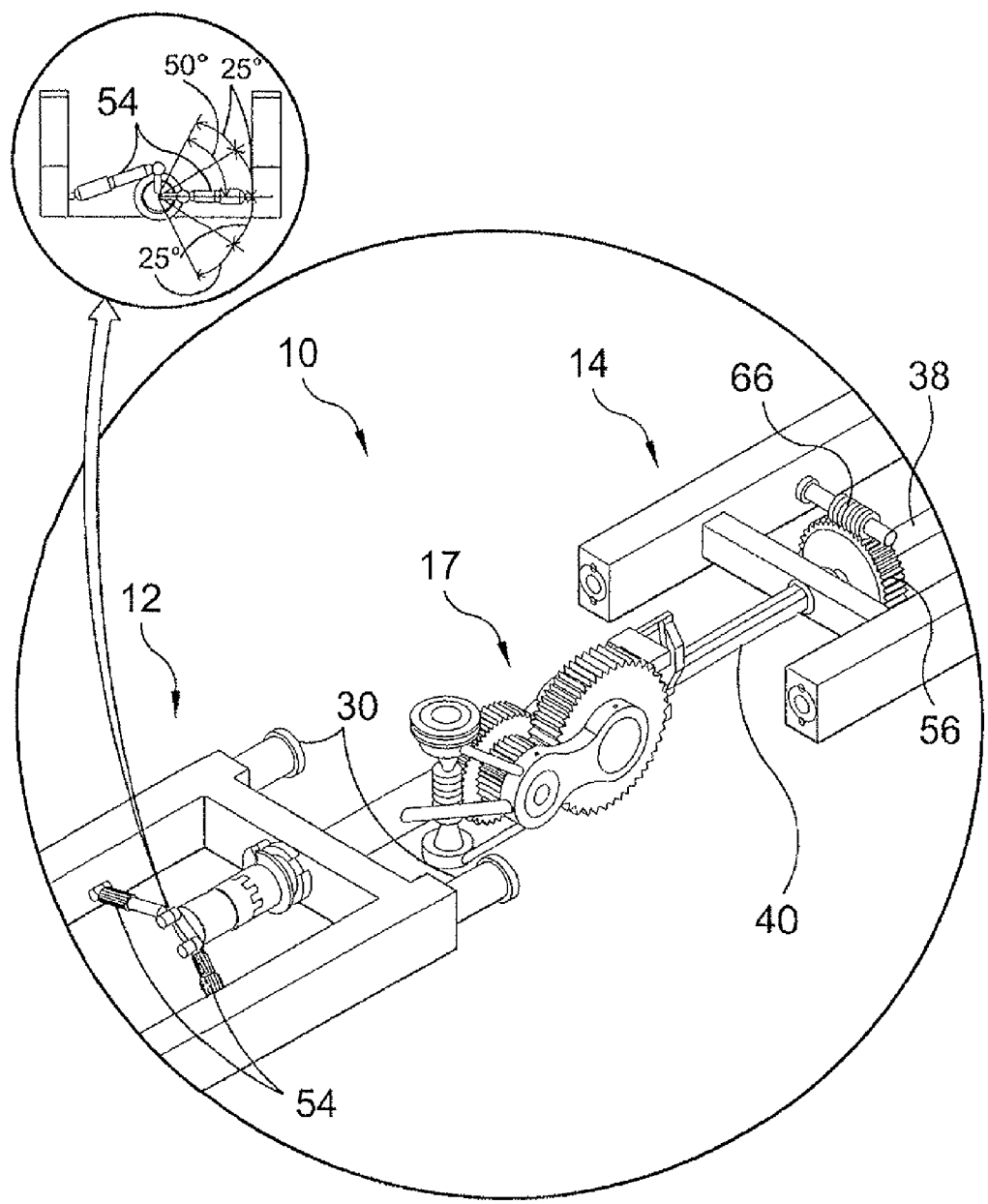
FIG. 8 is a detailed view of the central multi direction transmission system of the present invention.

FIG. 8 is a detailed view of the present invention 10 showing the separated front chassis 12 and the rear chassis 14 with the two central bars 30 retracted and its central hydraulic piston opened and showing a front view of the shock absorber 54 system and its torsion system in the 25° or more of torsion from each side including 90° or more, turn of the mechanism from first to second position. In this position, when the central multi-directional mechanism 17 is activated, it will go up and down. The shaft 38 of the central hydraulic piston has advanced the hexagonal bar 40 which was rotated by the turning auxiliary mechanism 56 and its related worm gear 66 thereby rotating the central multi-directional mechanism 17 to the second vertical position.

Figure 9:
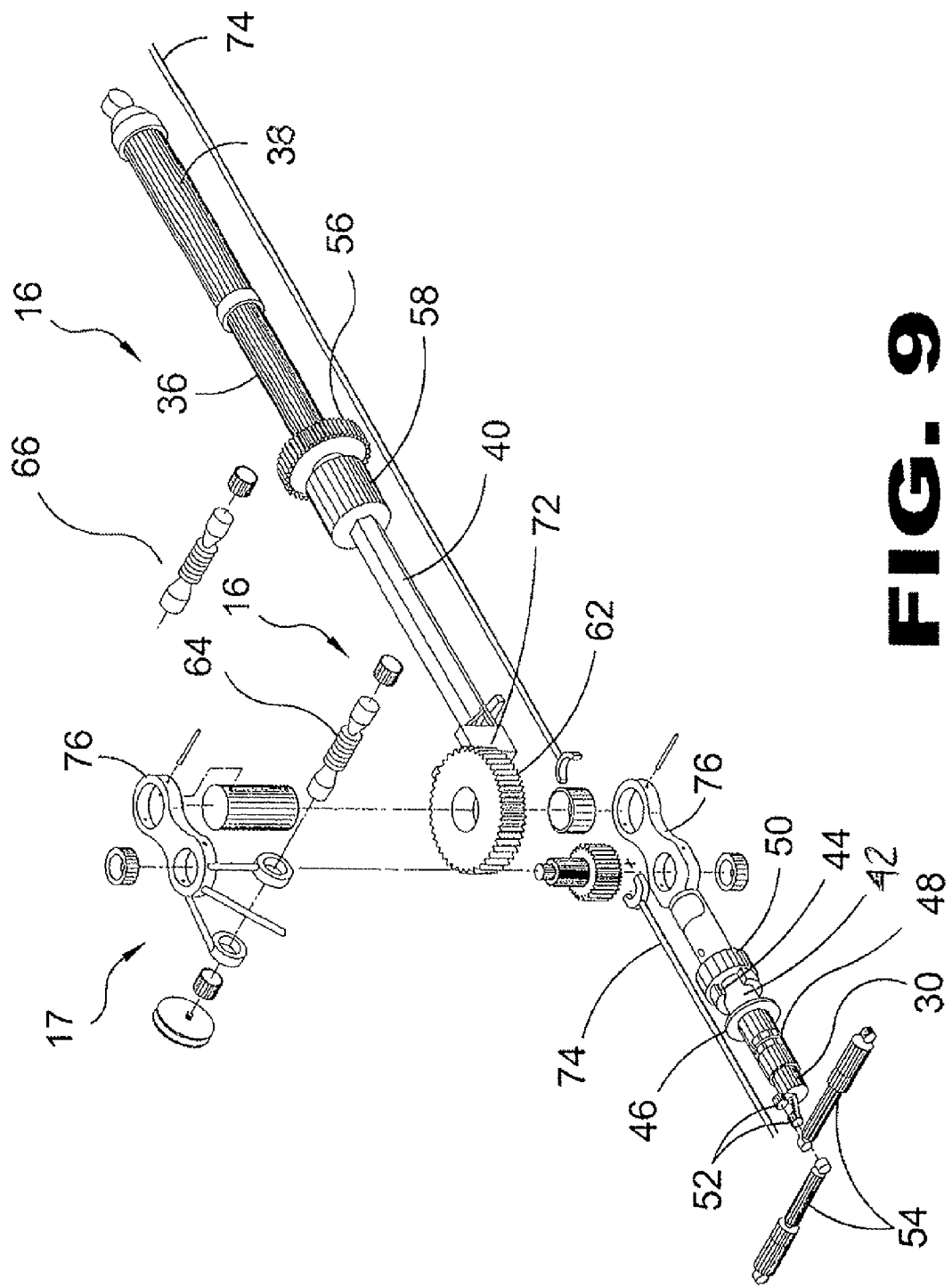
FIG. 9 is an exploded view of the central multi direction system of the present invention.

FIG. 9 is an exploded view of the central multi-direction transmission 16 wherein the piston shaft 38 of the central hydraulic piston 36 extends and retracts the hexagonal bar 40 which is rotated during its linear movement by the turning auxiliary mechanism 56. The hexagonal bar 40 travels through a bearing 58 and is affixed to the central multi-directional mechanism 17 thus allowing it to be rotated simultaneously. A pair of yokes 76 retain the various components of the central multi-directional mechanism 17 including the main central gear 62 and the main worm screw 64. A central bar 30 extends from the central multi-directional mechanism 17 opposite the hexagonal bar 40. The components related to the central bar 30 include a back central gear 50, a pair of bumps 44 offset 90 degrees from one another, a central disc brake 46, a clutch gear 48 and arm supports 52 for securing the shock absorbers 54. Cardan joints 74 and shafts assist with stabilizing the central multi-directional mechanism 17.

Figure 10:
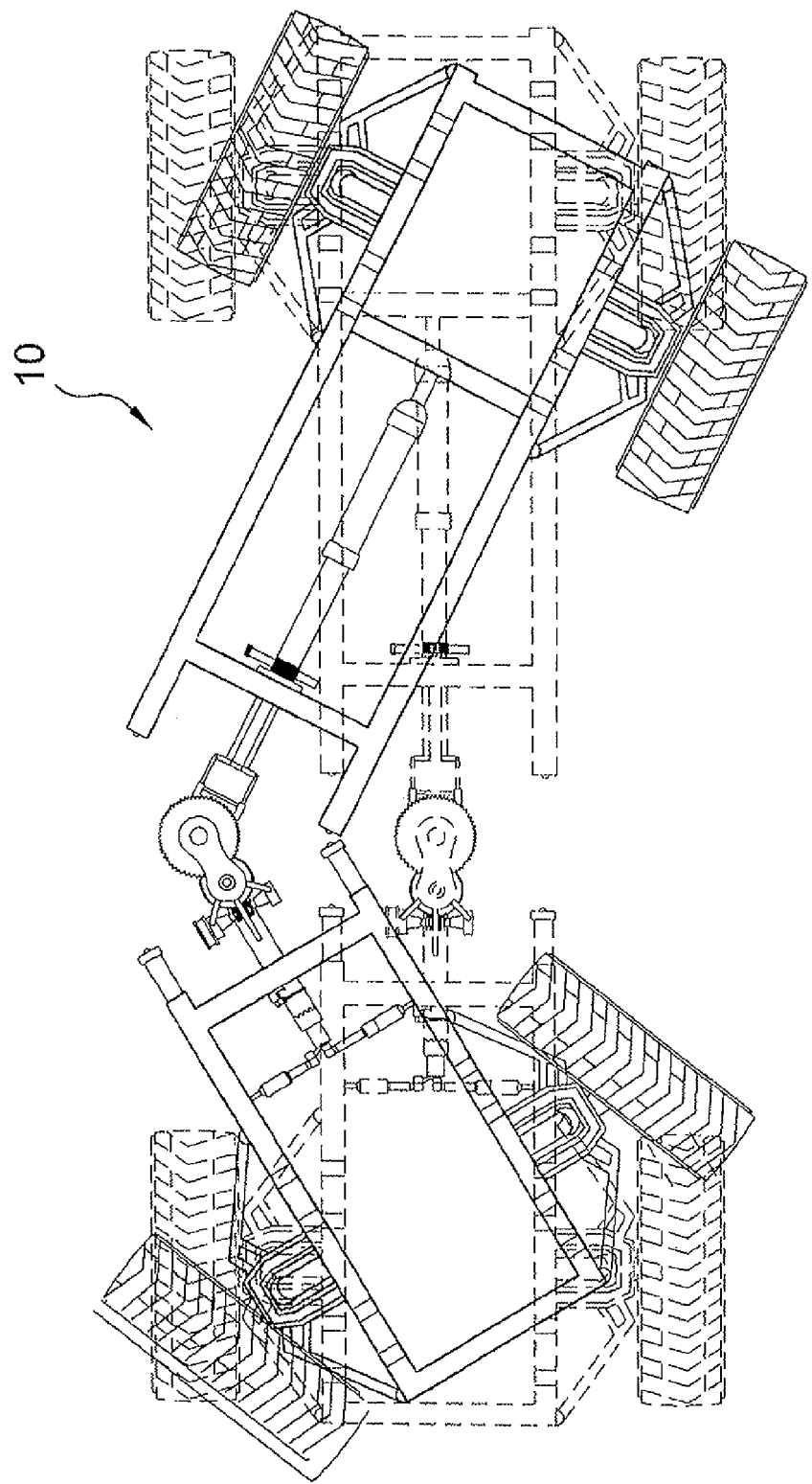
FIG. 10 is a top view showing the flexion process of the present invention.

FIG. 10 is a top view showing the flexion process of the present invention 10 showing the flexion process and chassis advancement. Three gears allow the flexion of the mechanism and with the strength of an electric motor, the mechanism will give a 60° or more in the chassis, this will allow it to make "U" turns.

Figure 11:
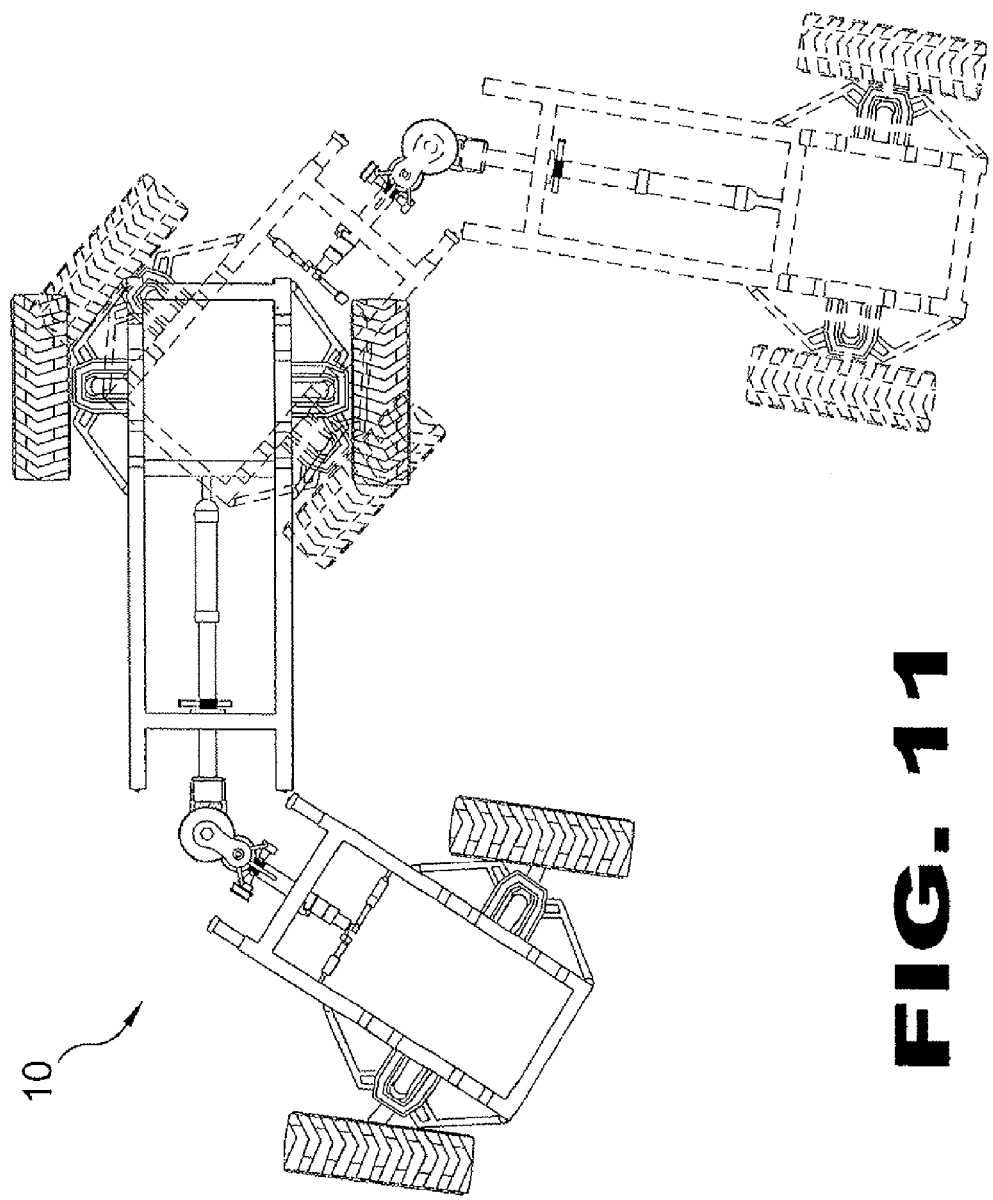
FIG. 11 is a top view showing the flexion process of the present invention.

FIG. 11 is a top view showing the flexion process of the present invention 10 showing the flexion process and chassis advancement. Three gears allow the flexion of the mechanism and with the strength of an electric motor, the mechanism will give a 60° or more in the chassis, this will it to make "U" turns.

Figure 12:
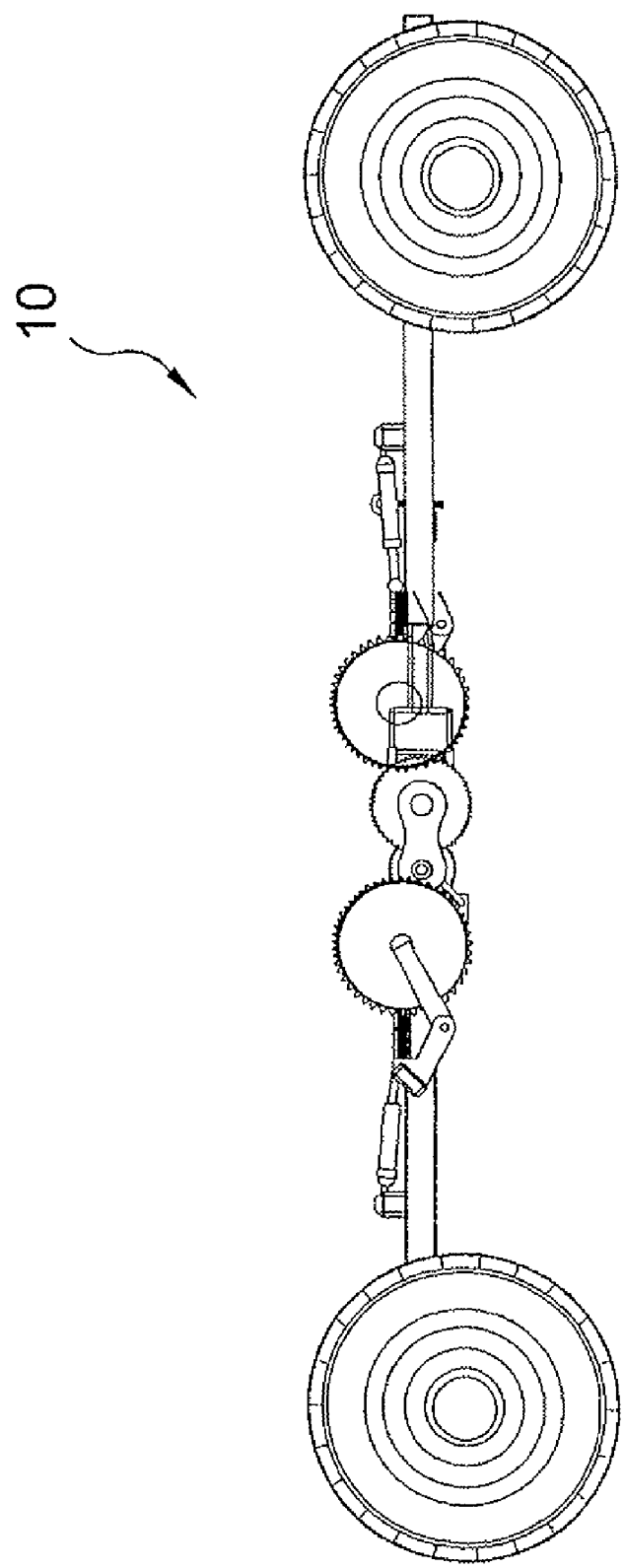
FIG. 12 is a side view of the present invention prior to flexion.

FIG. 12 is a side view of the present invention 10 prior to flexion. Shown is the first step of the flexion process and chassis advancement of the present invention 10. The following FIGS. 13 through 17 are a continuation of the flexion process and are illustrated in steps.

Figure 13:
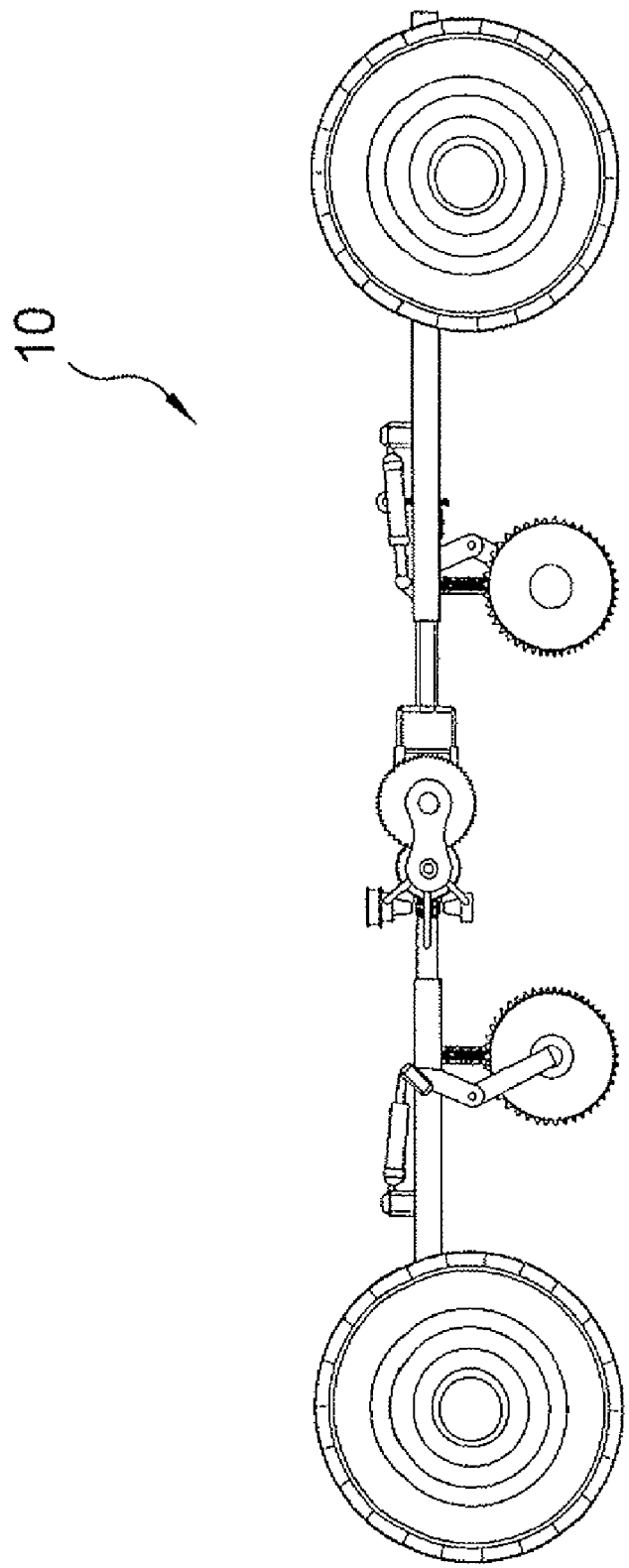
FIG. 13 is a side view of step two of the flexion process of the present invention.

FIG. 13 is a side view of step two of the flexion process of the present invention 10. Shown is step two of the flexion process and chassis advancement of the present invention 10.

Figure 14:
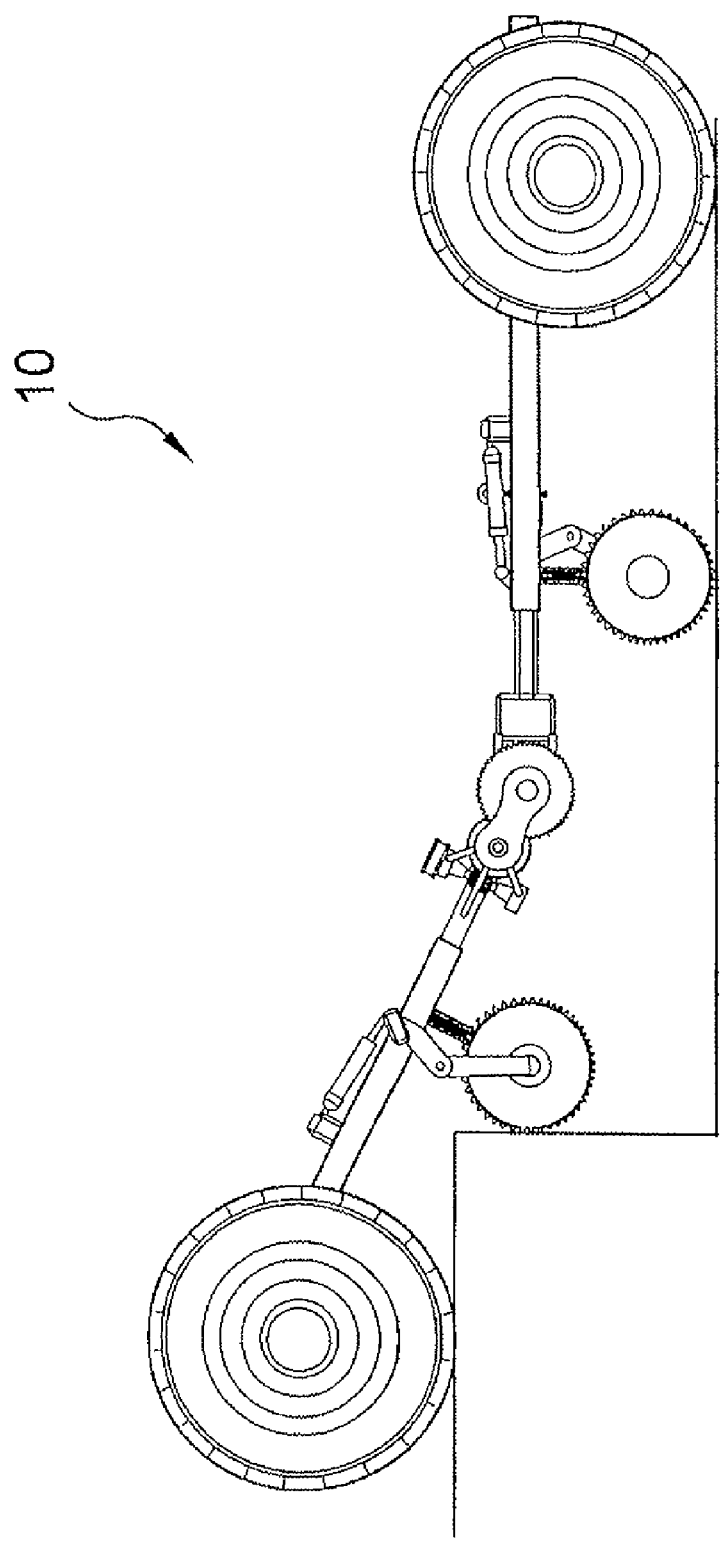
FIG. 14 is a side view of step three of the flexion process of the present invention.

FIG. 14 is a side view of step three of the flexion process of the present invention 10. Shown is step three of the flexion process and chassis advancement of the present invention 10.

Figure 15:
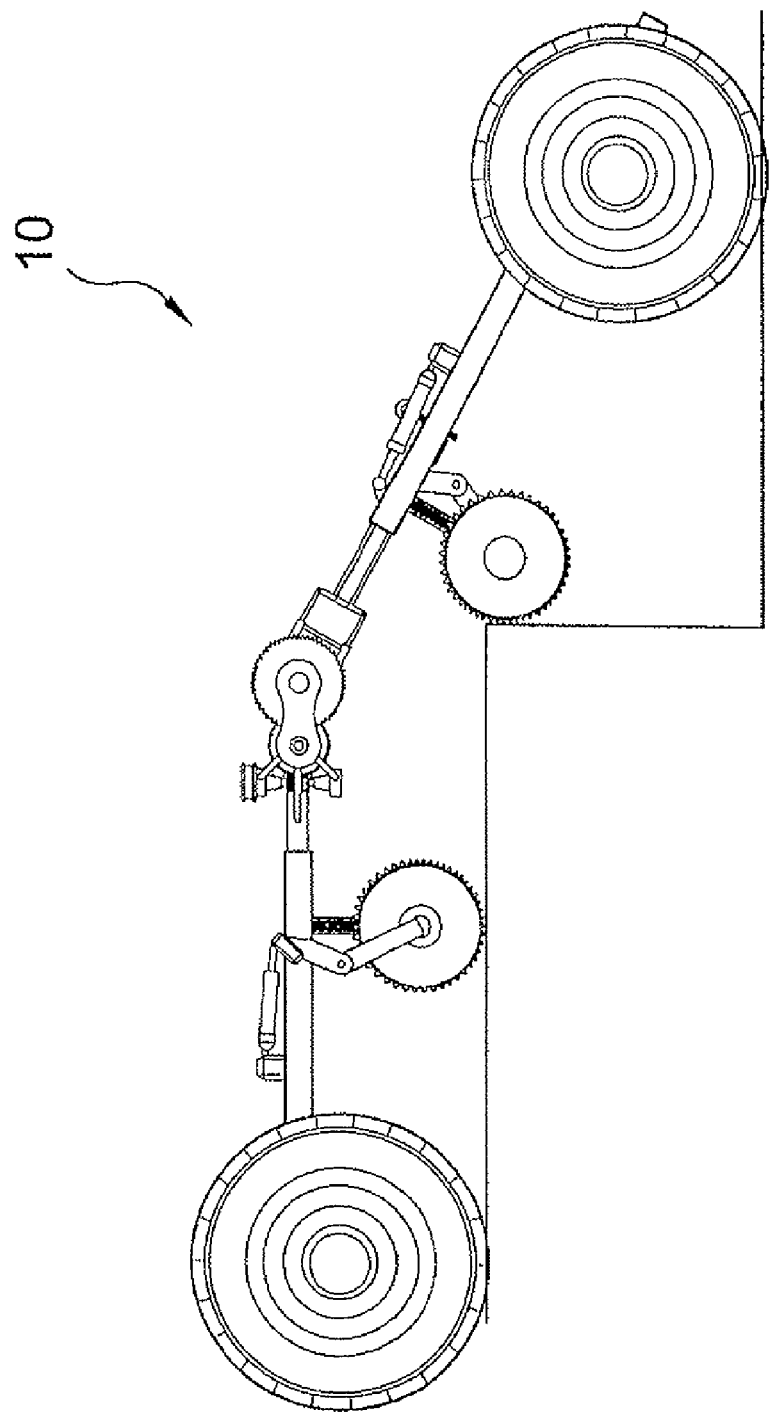
FIG. 15 is a side view of step four of the flexion process of the present invention.

FIG. 15 is a side view of step four of the flexion process of the present invention 10. Shown is step four of the flexion process and chassis advancement of the present invention 10.

Figure 16:
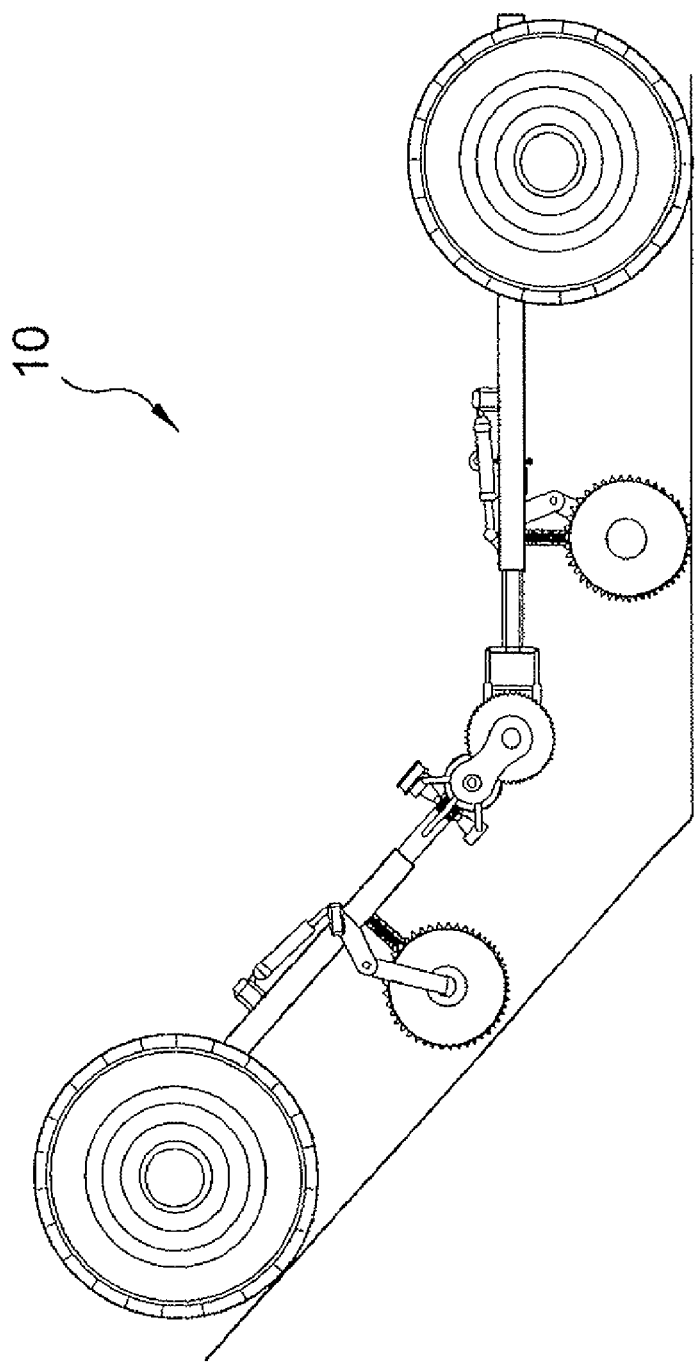
FIG. 16 is a side view of step five of the flexion process of the present invention.

FIG. 16 is a side view of step five of the flexion process of the present invention 10. Shown is step five of the flexion process and chassis advancement of the present invention 10.

Figure 17:
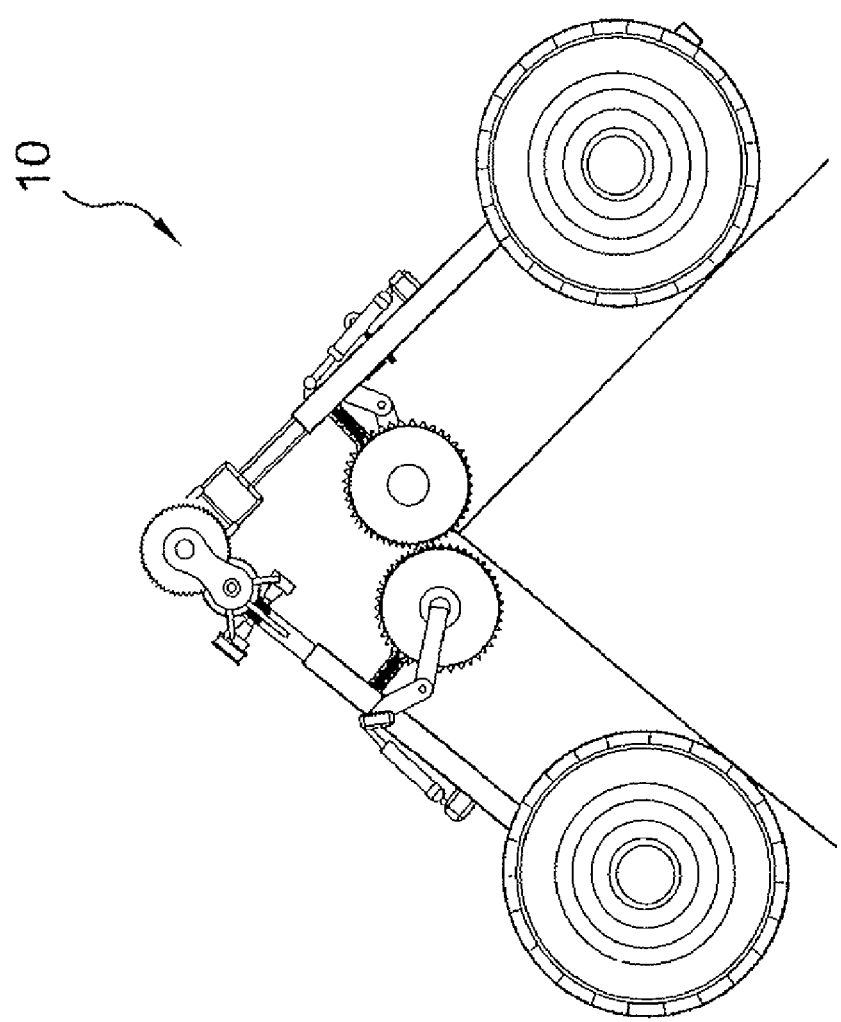
FIG. 17 is a side view of step six of the flexion process of the present invention.

FIG. 17 is a side view of step six of the flexion process of the present invention 10. Shown is step six of the flexion process and chassis advancement of the present invention 10.

Figure 18:
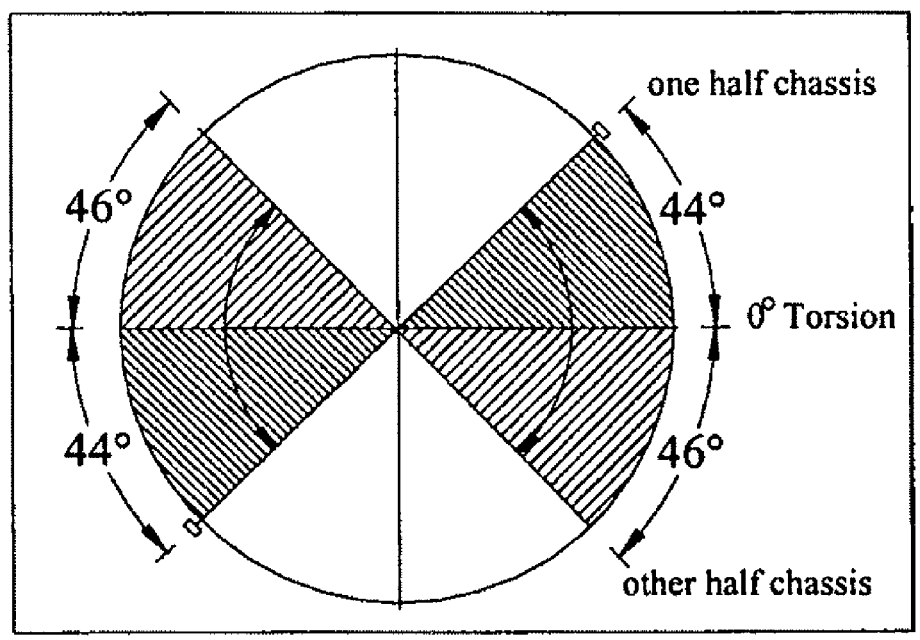
FIG. 18 is a graph of angular range of flexion for each chassis described in the present invention.

Referring to FIG. 18, is a graph is illustrated showing the angular range of flexion that can occur for each chassis described in the present invention.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A dual chassis frame with multi-directional transmission comprising: a) a rear chassis frame assembly; b) a front chassis frame assembly; c) a central multi-directional mechanism connecting a medial portion of said front chassis to a medial portion of said rear chassis to selectively allow for the independent horizontal and vertical movement of said front and rear chassis when traversing uneven terrain; d) a pair of hydraulically retractable central bars to selectively connect said front chassis to said rear chassis to form a unified, stable rigid chassis; e) a pair of fixed wheels disposed on a rear portion of said rear chassis and a pair of wheels disposed on a front portion of said front chassis; and g) means for increasing the distance between said front chassis and said rear chassis during dual chassis operation.

2. A dual chassis frame with multi-directional transmission as recited in claim 1, wherein said rear chassis frame assembly comprises: a) a pair of spaced-apart parallel side frames members, each having means for securing said central bars thereto disposed at the forward end thereof; b) a first bridge communicating between the forward portions of said side frame members; c) a rear bridge communicating between the rear portions of said side frame members; and d) a secondary bridge communicating between said side frame members and disposed in a region between said first bridge and said rear bridge.

3. A dual chassis frame with multi-directional transmission in claim 2, wherein said front chassis frame assembly comprises: a) a pair of substantially parallel, spaced apart side frame members having channels disposed on tips said side frame members thereof to house said central bars; b) a front bridge communicating between a front portion of said side frame members; and c) a rear bridge communicating between a rear portion of said side frame members.

4. A dual chassis frame with multi-directional transmission as recited in claim 3, wherein said central multi-directional transmission comprises: a) a central hydraulic piston having a movable portion and a stable end thereof fastened to said secondary bridge of said rear chassis; b) a hexagonal bar having a distal end extending from the movable portion of said piston; c) said central multi-directional mechanism disposed on the distal end of said hexagonal bar; d) a main bar extending from said central multi-directional mechanism opposite said hexagonal bar and passing through said rear bridge of said front chassis; e) a pair of bumps disposed on said main bar adjacent said rear bridge of said front chassis opposite said central multi-directional mechanism to act as stops to restrict rotation of said main bar and the related central multi-directional mechanism to a first horizontal position to a 90 degree rotation to a second vertical position and back again; f) a central disc brake disposed on said main bar adjacent said bumps; g) a clutch gear disposed on said main bar adjacent said central disc brake; h) a central gear disposed on said main bar adjacent said clutch gear; a pair of retractable wheels disposed on at least one of said front chasis frame assembly and rear chasis frame assembly between said central multi-direction mechanism and said pair of fixed wheels disposed on at least one of said rear portion of said rear chassis and said front portion of said front chassis and i) a pair of opposing shock absorbers originating at arm supports of said central gear and terminating at their respective said side frame members.

5. A dual chassis frame with multi-directional transmission as recited in claim 4, wherein said central multi-directional transmission further comprises a geared turning auxiliary mechanism transitionally disposed between the distal end of said movable portion of said central hydraulic piston and said hexagonal bar, said turning auxiliary mechanism being driven by a worm drive to extend and rotate said hexagonal bar and the associated central multi-directional mechanism from said first position to said second position and back to said first position.

6. A dual chassis frame with multi-directional transmission as recited in claim 5, further including a bearing guide surrounding said hexagonal bar and disposed within said first bridge of said rear chassis.

7. A dual chassis frame with multi-directional transmission as recited in claim 4, wherein said means for securing said central bars is a pair of pressure locks.

8. A dual chassis frame with multi-directional transmission as recited in claim 7, further comprising a chassis connecting means including providing said central hydraulic piston in a fully retracted position to place said central multi-directional mechanism in the horizontal first position, said retractable wheels fully retracted into their respective chassis, said disc brake applied fully in the braking position, and both said central bars fully extended from said rear chassis and secured to said pressure locks on said front chassis thereby forming a stable, unified chassis.

9. A dual chassis frame with multi-directional transmission as recited in claim 4, further comprising a pair of selectively retractable wheels disposed on a front portion of said rear chassis and a pair of selectively retractable wheels disposed on a rear portion of said front of said front chassis.

10. A dual chassis frame with multi-directional transmission as recited in claim 9, wherein said chassis is placed into dual chassis mode by the following functions: a) releasing said pressure locks; b) extending said retractable wheels; c) retracting said central bars; d) releasing said disc brake; and e) extending said central hydraulic piston thereby effectively extending said hexagonal bar and said central multi-directional mechanism to increase the distance between said front chassis and said rear chassis, said central multi-directional mechanism is simultaneously rotating from said first horizontal position to said second vertical position.

11. A dual chassis frame with multi-directional transmission as recited in claim 4, wherein said arm supports are designated as a main arm and a second arm and said main arm is mounted on the end of said main bar and has a vertical initial position of 90° according to said second arm based on an initial position of said second arm with the vehicle leveled at 0° of torsion, including the 90° turn of said central multi dimensional mechanism, 50° of each side and the 25° of torsion, these degrees of torsion are included in the 50° torsion on each side, the 50° or more will accrue when lifting or bringing down one wheel or a vehicles corner, leaving the other half chassis in a horizontal position or 0° of torsion.

12. A dual chassis frame with multi-directional transmission as recited in claim 4, wherein said central multi-directional mechanism further comprises a gear assembly including a main central gear, a main worm screw, a union, a pair of yokes and a pair of cooperating cardan joints.

13. A dual chassis frame with multi-directional transmission, comprising: a) a rear chassis frame assembly; b) a front chassis frame assembly; c) a pair of hydraulically retractable central bars to selectively connect and disconnect said front chassis and said rear chassis to form a unified, stable rigid chassis to a independently movable, yet coupled multi-directional front chassis and rear chassis, wherein said rear chassis frame assembly comprises side frame members having a means for securing said central bars to said rear chassis frame assembly, wherein said means for securing said central bars is a pair of pressure locks; d) a central multi-directional mechanism connecting a medial portion of said front chassis to a medial portion of said rear chassis to selectively allow independent horizontal and vertical movement of said front and rear chassis for traversing uneven terrain when said front chassis and rear chassis are disconnected from each other by said hydraulically retractable central bars; e) a pair of fixed wheels disposed on a rear portion of said rear chassis and a pair of wheels disposed on a front portion of said front chassis; and f) means for increasing the distance between said front chassis and said rear chassis during dual chassis operation.

14. A dual chassis frame with multi-directional transmission as recited in claim 13, wherein said rear chassis frame assembly comprises: a) a pair of spaced-apart parallel said side frames members, each having means for securing said central bars thereto disposed at the forward end thereof; b) a first bridge communicating between the forward portions of said side frame members; c) a rear bridge communicating between the rear portions of said side frame members; and d) a secondary bridge communicating between said side frame members and disposed in a region between said first bridge and said rear bridge.

15. A dual chassis frame with multi-directional transmission as recited in claim 14, wherein said multi-directional transmission further comprises a geared turning auxiliary mechanism transitionally disposed between the distal end of said movable portion of said central hydraulic piston and said hexagonal bar, said turning auxiliary mechanism being driven by a worm drive to extend and rotate said hexagonal bar and the associated central multi-directional mechanism from said first position to said second position and back to said first position.

16. A dual chassis frame with multi-directional transmission as recited in claim 15, further including a bearing guide surrounding said hexagonal bar and disposed within said first bridge of said rear chassis.

17. A dual chassis frame with multi-directional transmission as recited in claim 14, wherein said means for securing said central bars is a pair of pressure locks.

18. A dual chassis frame with multi-directional transmission in claim 13, wherein said front chassis frame assembly comprises: a) a pair of substantially parallel, spaced apart side frame members having channels disposed on tips said side frame members of said front chassis frame assembly thereof to house said central bars; b) a front bridge communicating between a front portion of said side frame members; and c) a rear bridge communicating between a rear portion of said side frame members.

19. A dual chassis frame with multi-directional transmission as recited in claim 18, wherein said multi-directional transmission comprises: a) a central hydraulic piston having a movable portion and a stable end thereof fastened to said secondary bridge of said rear chassis; b) a hexagonal bar having a distal end extending from the movable portion of said piston; c) said central multi-directional mechanism disposed on the distal end of said hexagonal bar; d) a main bar extending from said central multi-directional mechanism opposite said hexagonal bar and passing through said rear bridge of said front chassis; e) a pair of bumps disposed on said main bar adjacent said rear bridge of said front chassis opposite said central multi-directional mechanism to act as stops to restrict rotation of said main bar and the related central multi-directional mechanism to a first horizontal position to a 90 degree rotation to a second vertical position and back again; f) a central disc brake disposed on said main bar adjacent said bumps; g) a clutch gear disposed on said main bar adjacent said central disc brake; h) a central gear disposed on said main bar adjacent said clutch gear; and i) a pair of opposing shock absorbers originating at arm supports of said central gear and terminating at their respective said side frame members.

20. A dual chassis frame with multi-directional transmission as recited in claim 19, further comprising a chassis connecting means including providing said central hydraulic piston in a fully retracted position to place said central multi-directional mechanism in the horizontal first position, said retractable wheels fully retracted into their respective chassis, said disc brake applied fully in the braking position, and both said central bars fully extended from said rear chassis and secured to said pressure locks on said front chassis thereby forming a stable, unified chassis.

21. A method for using a dual chassis frame with multi-directional transmission including a rear chassis frame assembly, a front chassis frame assembly, a multi-directional mechanism connecting a medial portion of said front chassis to a medial portion of said rear chassis to selectively allow for the independent horizontal and vertical movement of said front and rear chassis when traversing uneven terrain, a pair of hydraulically retractable central bars and pressure locks to selectively connect said front chassis to said rear chassis to form a unified, stable rigid chassis and selectively disconnect said front chassis from said rear chassis to allow independent horizontal and vertical movement of said front and rear chassis, a pair of fixed wheels disposed on a rear portion of said rear chassis and a pair of wheels disposed on a front portion of said front chassis, a main bar extending from said central multi-directional mechanism opposite a hexagonal bar and passing through a rear bridge of said front chassis, a pair of bumps disposed on said main bar adjacent said rear bridge of said front chassis opposite said central multi-directional mechanism to act as stops to restrict rotation of said main bar and the related central multi-directional mechanism to a first horizontal position to a 90 degree rotation to a second vertical position and back again, a central disc brake disposed on said main bar adjacent said bumps, and a central hydraulic piston with a movable portion comprising said hexagonal bar for increasing the distance between said front chassis and said rear chassis during dual chassis operation, wherein said dual chassis frame is placed into dual chassis mode by the following functions: a) releasing said pressure locks; b) retracting said central bars; c) releasing said central disc brake; and d) extending said central hydraulic piston thereby effectively extending said hexagonal bar and said central multi-directional mechanism to increase the distance between said front chassis and said rear chassis.

* * * * *